US012637198B2

(12) United States Patent
Nagara Venkatachala et al.

(10) Patent No.: US 12,637,198 B2
(45) Date of Patent: May 26, 2026

(54) AIRCRAFT FUSELAGE

(71) Applicants: Airbus (S.A.S.), Blagnac Cedex (FR); Airbus Operations GmbH, Hamburg (DE); Airbus Operations (S.A.S.), Toulouse (FR)

(72) Inventors: Adithya Nagara Venkatachala, Bristol (GB); Jayaparthan Jagadeesan, Bristol (GB); Cristobal Federico Brito Maur, Hamburg (DE); Benoît Thomas, Toulouse (FR)

(73) Assignees: Airbus (S.A.S.), Blagnac (FR); Airbus Operations GmbH, Hamburg (DE); Airbus Operations (S.A.S.), Toulouse (FR)

( * ) Notice: Subject to any disclaimer, the term of this patent is extended or adjusted under 35 U.S.C. 154(b) by 96 days.

(21) Appl. No.: 18/819,322

(22) Filed: Aug. 29, 2024

(65) Prior Publication Data

US 2025/0074574 A1 Mar. 6, 2025

(30) Foreign Application Priority Data

Sep. 1, 2023 (IN) .............................. 202311058863

(51) Int. Cl.
B64C 1/14 (2006.01)
(52) U.S. Cl.
CPC .......... B64C 1/1415 (2013.01); B64C 1/1438 (2013.01); B64C 1/1469 (2013.01)
(58) Field of Classification Search
CPC ... B64C 1/1438; B64C 1/1469; B64C 1/1461; B64C 1/1407; B60J 10/80–88;
(Continued)

(56) References Cited

U.S. PATENT DOCUMENTS 1,954,987 A 4/1934 Clark
3,334,375 A * 8/1967 Hubbard ................. E06B 3/924
16/97
(Continued)

FOREIGN PATENT DOCUMENTS

CA 2062774 A1 1/1991
DE 1218290 B 6/1966
(Continued)

OTHER PUBLICATIONS

Extended European Search Report for EP Application No. 24194768. 8, dated Dec. 16, 2024, 9 pages.
(Continued)

*Primary Examiner* — Joshua J Michener
*Assistant Examiner* — Colin Zohoori
(74) *Attorney, Agent, or Firm* — KDW Firm PLLC

(57) ABSTRACT

An aircraft fuselage includes fore and aft sections, a barrier wall separating the sections and an opening therebetween, a rail attached to the barrier wall, a door moveable across the barrier wall between an open position offset from the opening and a closed position covering the opening, a first roller and a second roller rotatably fixed to the door and moveable on the rail along first and second paths to move the door, the rail including a first ramp engaging the first roller as it moves along the first path and to direct the first roller towards the barrier wall, and a second ramp engaging the second roller as it moves along the second path and to direct the second roller towards the barrier wall, the first roller configured to engage the first ramp as the second roller engages the second ramp to move the door towards the barrier wall.

18 Claims, 9 Drawing Sheets

(58) Field of Classification Search
    CPC ..... E05D 15/06; E05D 15/0621; E05D 15/10;
                        E05D 15/16–22; E05D 2015/225
    See application file for complete search history.

(56)                References Cited

U.S. PATENT DOCUMENTS 3,611,637  A  *  10/1971  Saino ................... E05D 15/565
                                                        49/235
4,569,164  A  *   2/1986  Dickson ............. E05D 15/0608
                                                        160/206
4,597,549  A       7/1986  Ryan
4,911,219  A       3/1990  Dalrymple
5,016,318  A  *   5/1991  Harris ................ E05D 15/0608
                                                        160/206
6,010,286  A       1/2000  Cross
7,610,718  B2 *  11/2009  Kopish .............. E05D 15/1042
                                                        49/211
8,528,622  B2      9/2013  Ehrlich
9,470,028  B2 *  10/2016  Header .............. E05D 15/0652

2006/0145007  A1    7/2006  Melberg
2010/0059628  A1    3/2010  Kobayashi
2011/0315822  A1   12/2011  Fairchild
2016/0245006  A1    8/2016  Joussellin
2016/0340019  A1   11/2016  Telmos
2020/0207454  A1    7/2020  Gallagher, Jr.
2020/0386025  A1   12/2020  Dreyer

FOREIGN PATENT DOCUMENTS

DE         1232475  B      1/1967
EP         2578788  B1     9/2015
FR         2015042  A1     4/1970
FR         2945027  A1    11/2010
JP      2007154429  A      6/2007

OTHER PUBLICATIONS

United Kingdom Intellectual Property Search Report for Applica-
tion No. GB2316442.9, dated Feb. 26, 2024, 5 pages.

* cited by examiner

FIG. 6           FIG. 7

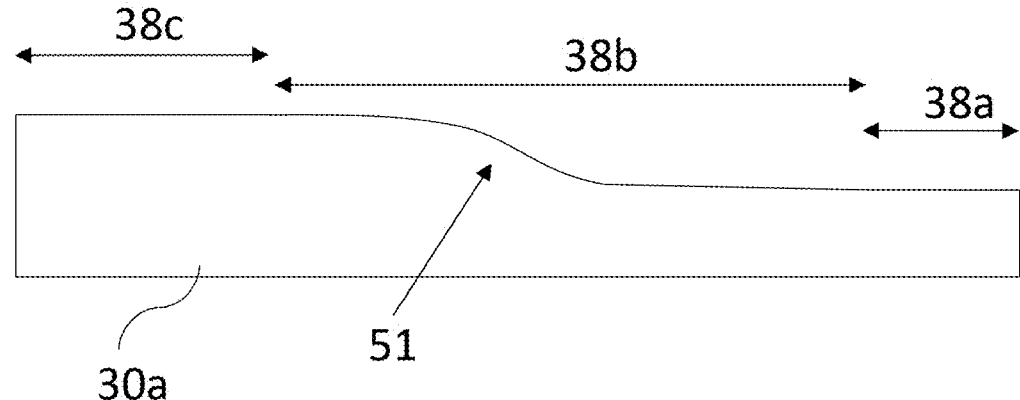
FIG. 11
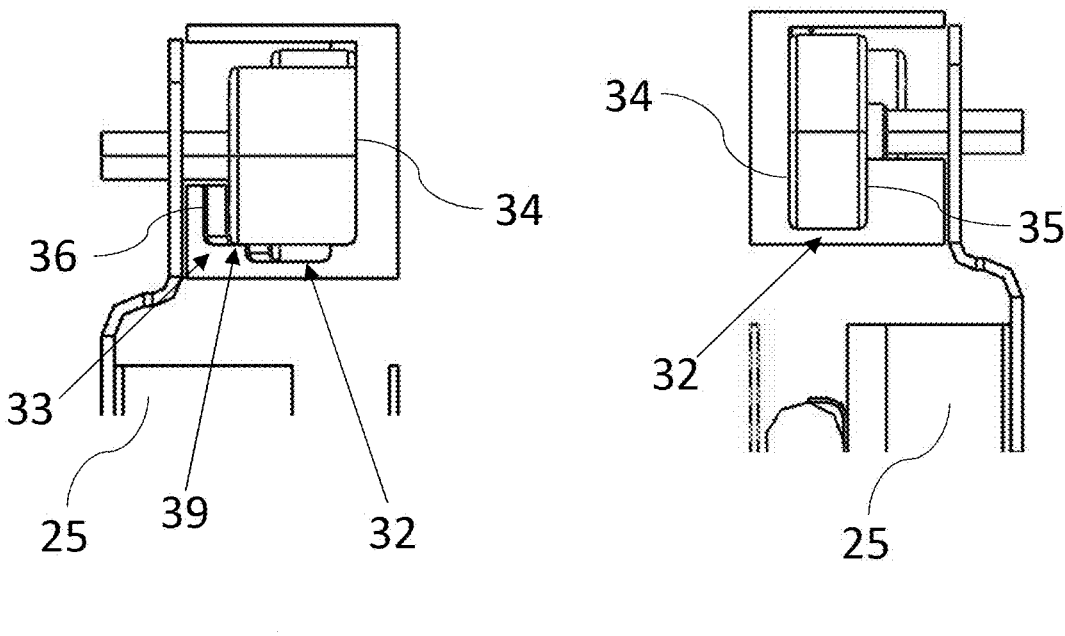
FIG. 12          FIG. 13

AIRCRAFT FUSELAGE

TECHNICAL FIELD

The disclosure herein relates to an aircraft fuselage, and an aircraft comprising the aircraft fuselage.

BACKGROUND

A barrier wall may be provided adjacent to the cargo section of a freighter aircraft, the barrier wall intended to arrest forward movement of any cargo containers in the event of an emergency landing or other event. A door provides access through the barrier wall, with the door arranged to provide a tight, smoke-proof seal across the threshold while occupying minimal space in the cargo section. The door is thereby arranged to move laterally through the barrier wall between open and closed positions.

Sealing on lateral sliding doors can be achieved by either using lip/brush seals, which continuously brush against the sealing surface, or by moving the sliding door in the longitudinal direction to compress a seal. Movement of the door in the longitudinal direction is typically achieved with the help of non-linear guide tracks, such as S-shaped rails and curved end rails.

Generally, lip/brush seals are not compatible where a complete airtight and watertight seal is desired through the threshold of the door. While the use of S-shaped rails, and the like, can increase the space envelope required for the door beyond acceptable limits.

SUMMARY

A first aspect of the disclosure herein provides an aircraft fuselage comprising: fore and aft sections of the aircraft fuselage, a barrier wall separating the fore and aft sections and the barrier wall defining an opening therebetween; a rail attached to the barrier wall; a door moveable across the barrier wall between an open position in which the door is offset from the opening and a closed position in which the door covers the opening; a first roller and a second roller each rotatably fixed to the door and moveable on the rail along respective first and second paths to move the door between the open and closed positions; wherein the rail includes a first ramp configured to engage the first roller as the first roller moves along the first path, the first ramp configured to direct the first roller towards the barrier wall, and a second ramp configured to engage the second roller as the second roller moves along the second path, the second ramp configured to direct the second roller towards the barrier wall, wherein the first roller is configured to engage the first ramp as the second roller engages the second ramp to move the door towards the barrier wall.

This allows the whole door to move towards the barrier wall at the same time, such that the seals on the door/barrier wall engage at the same time across the width of the door.

A portion of the lateral extent of the first roller between the door and barrier wall may overlap with the lateral extent of the second roller.

Overlapping lateral extents of the rollers helps minimize the space occupied by the rail.

The first path may be arranged such that the first roller bypasses the second ramp.

With this arrangement, the door can be maintained parallel/normal to the barrier wall until both rollers simultaneously engage the respective ramps.

The first and second rollers may each be retained between a first wall of the rail adjacent the barrier wall and a second wall laterally spaced from the first wall and adjacent the door.

With this arrangement, the first wall defines a minimum distance of the rollers from the barrier wall and the second wall defines a minimum distance from the door.

The first and second rollers may be retained by a common first wall. This arrangement can better utilize the available space.

The first and second rollers may each have a width extending parallel to a rotational axis of the respective roller, wherein the width of the second roller is greater than the width of the first roller.

With this arrangement, the first roller can be thin enough to bypass the second ramp while sharing a first wall with the second roller. This can reduce the utilized space.

The width difference between the first and second rollers may be substantially the same as a height of the second ramp.

This can minimize the space utilized by the roller while providing the space for the first roller to bypass the second ramp.

The first roller may have a diameter greater than the second roller.

With this arrangement, the protruding portion of the first roller resultant from its greater diameter can be used to engage the first roller separately from the second roller to provide separate and distinct first and second paths.

The rail may comprise a first channel defining the first path, and a second channel defining the second path, wherein the first channel is stepped from the second channel.

With this arrangement, distinct paths can be defined by the step between the channels. The rail may comprise a first channel defining the direction of the first path, the first channel having a width substantially the same as the first roller, and a second channel defining the direction of the second path, the second channel having a width substantially the same as the second roller.

Each roller can thereby be fixed in position relative to the barrier wall and door.

The rail may be an upper rail located towards an upper end of the door.

The aircraft fuselage may comprise a lower rail located towards a lower end of the door.

Each ramp may be smoothly curved.

Each ramp may include an inflection point so as to be substantially 'S' shaped.

The first path and second path may include linear sections either side of a ramp section at which the respective first or second ramp is located.

A door seal may extend around a periphery of the door and/or a barrier wall seal may extend around a periphery of the opening in the barrier wall for sealing the door against the barrier wall.

The door may be located on an aft side of the barrier wall.

The aft side of the fuselage may be a cargo section comprising one or more containers.

The barrier wall may be attached to a fuselage frame.

A further aspect of the disclosure herein provides an aircraft comprising the aircraft fuselage of the first aspect.

BRIEF DESCRIPTION OF THE DRAWINGS

Embodiments of the disclosure herein will now be described with reference to the accompanying drawings, in which:

FIG. 6 shows an upper rail on which rollers of the door are moveable;

FIG. 7 shows a lower rail on which rollers of the door are moveable;

FIG. 11 shows an example of the profile of one of the ramps that the roller engages;

FIG. 12 shows a view of the upper rail viewed in the direction of travel from the open position to the closed position of the door;

FIG. 13 shows a view of the upper rail viewed in the direction of travel from the closed position to the open position of the door;

DETAILED DESCRIPTION

Figure 1:
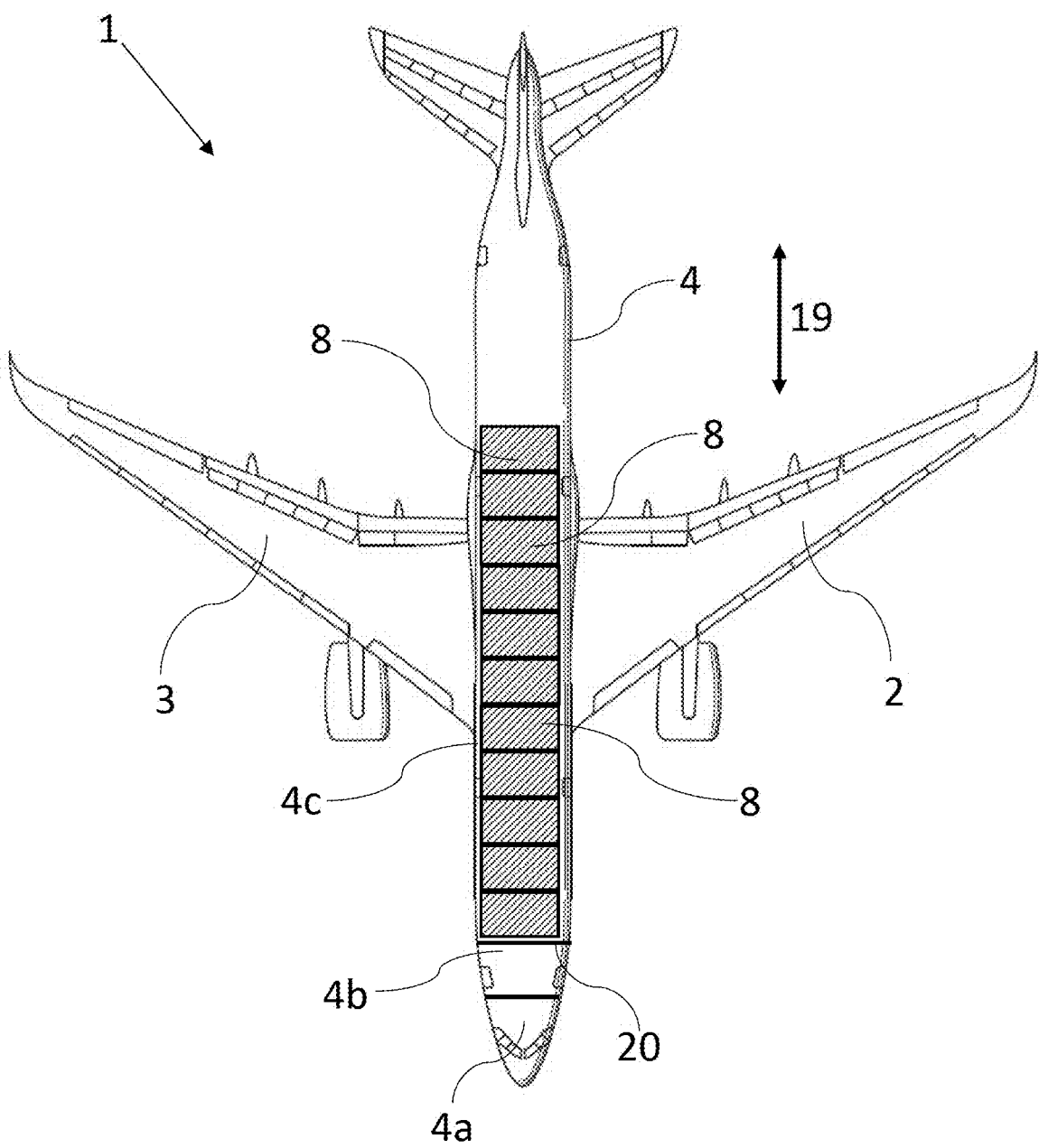
FIG. 1 shows an aircraft.

FIG. 1 shows an aircraft 1 with port and starboard wings 2, 3. Each wing 2, 3 has a cantilevered structure with a length extending in a generally spanwise direction from a root to a tip, the root being joined to an aircraft fuselage 4.

The fuselage 4 has a longitudinal axis 19 that extends in a fore-aft direction. The fuselage 4 defines two or more sections 4a, 4b, 4c along the longitudinal axis 19. The example shown in FIG. 1 includes a cockpit section 4a, a courier section 4b (also referred to as a courier region or supernumerary compartment), and a cargo section 4c. The cargo section 4c is separated from the cockpit and courier sections 4a, 4b by a barrier wall 20 (also referred to as a rigid cargo barrier—RCB), with the cargo section 4a including one or more cargo containers 8. The barrier wall 20 is a structural wall arranged to prevent movement of the cargo containers 8 forward of the barrier wall 20 in the event of an emergency landing or other in-service event that can accelerate the cargo containers 8 forward. The barrier wall 20 may be formed of metal or other suitable material such as carbon fibre reinforced polymer (CFRP).

Figure 2:
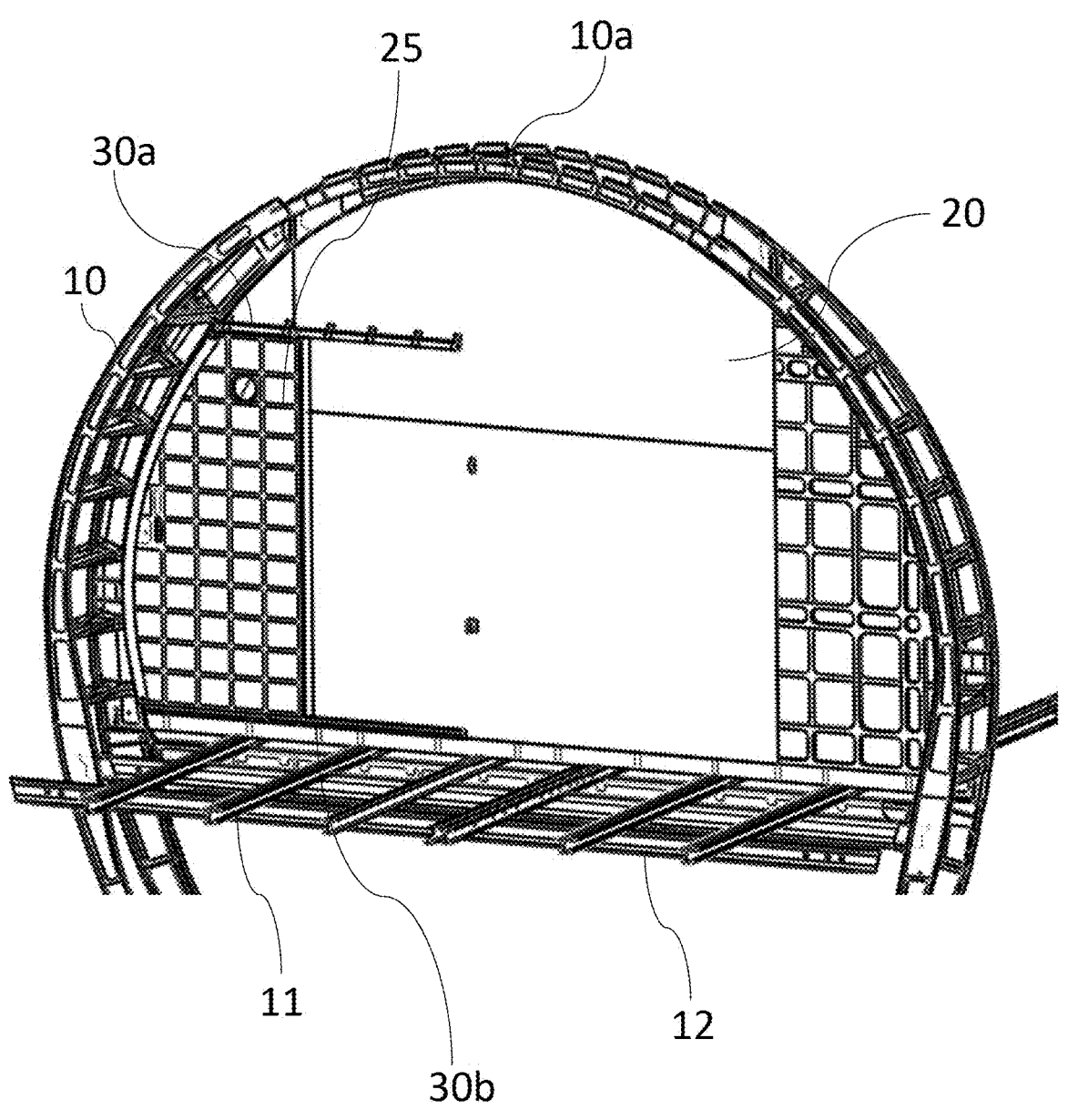
FIG. 2 shows a barrier wall attached to a fuselage frame of the aircraft.

FIG. 2 shows an example of a barrier wall 20. The barrier wall 20 is attached to the aircraft structure by a fuselage frame 10. The fuselage frame 10 is a transverse member lying in a plane normal to the longitudinal axis 19 of the fuselage 4 and arranged to support the aircraft skin (not shown) to define a cross-section of the fuselage 4. The fuselage 4 may include a plurality of fuselage frames 10 spaced along the longitudinal axis 19 of the fuselage 4. The fuselage frames 10 may be formed of metal or other suitable material.

The barrier wall 20 extends across an upper portion of the fuselage frame 10. The barrier wall 20 may extend from a floor level (indicated generally by longitudinal and transverse beams 11, 12) to an upper-most inner edge 10a of the fuselage frame 10, although it will be appreciated that the barrier wall 20 may extend across any suitable portion of the fuselage frame 10.

The barrier wall 20 defines an opening 21 (See FIG. 3), in particular an opening 21 between the courier section 4b and the cargo section 4c. A door 25 is attached to the barrier wall 20 via upper and lower rails 30a, 30b, with the door 25 moveable on the rails 30a, 30b. The door 25 moves in a straight line across the barrier wall 20 between an open position in which the door 25 is offset from the opening 21 and a closed position in which the door 25 covers the opening 21.

The door 25 is arranged to seal the opening 21 in the closed position so as to prevent the spread of smoke through the opening 21 in the event of a fire in the cargo section 4c.

Figure 3:
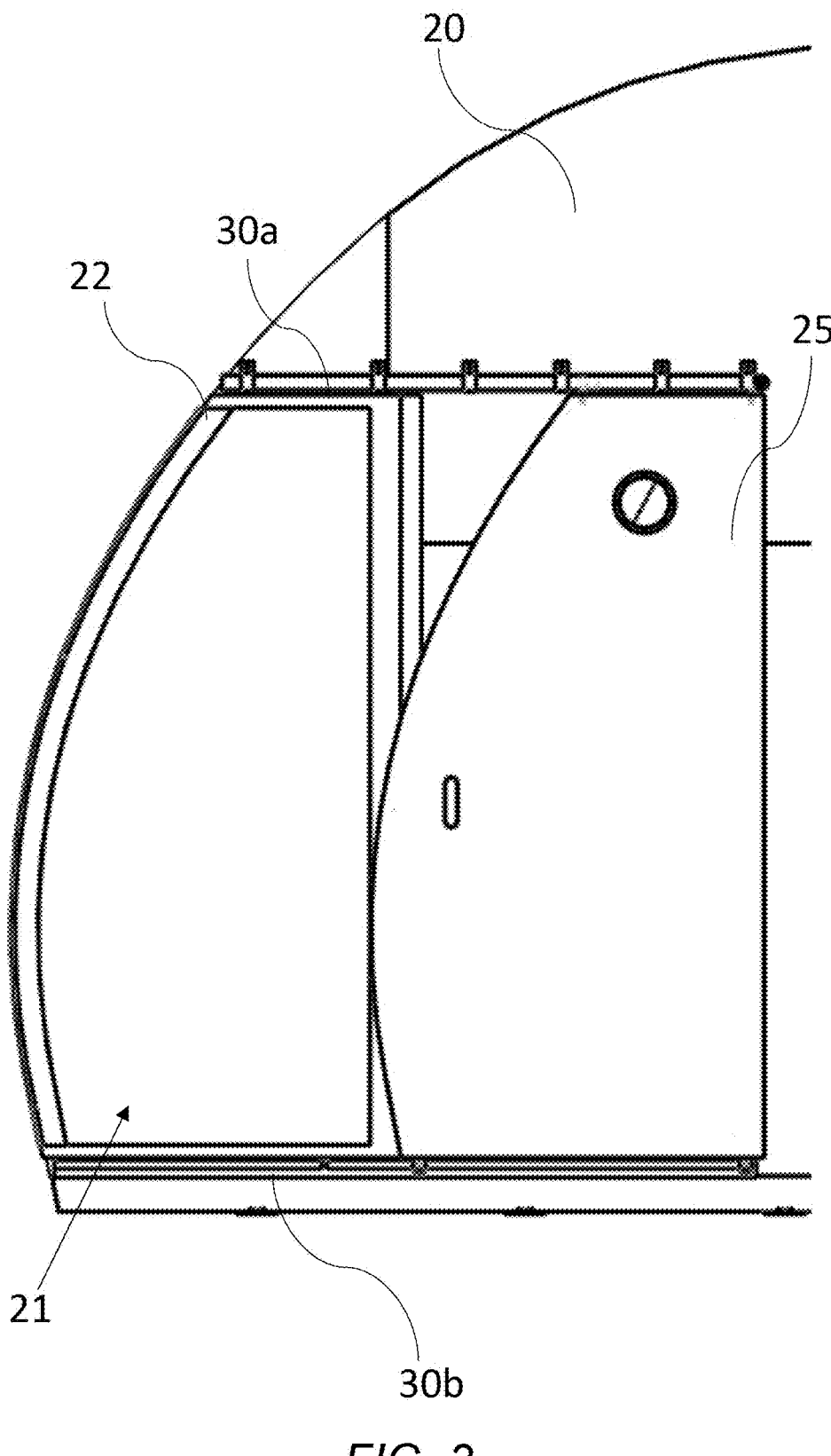
FIG. 3 shows a door adjacent the barrier wall in an open position.

FIG. 3 shows the door 25 in an open position in which the door 25 is offset from the opening 21. The door 25 is preferably entirely offset from the opening when viewed in a plane normal to the longitudinal axis 19 of the fuselage 4, although it may be partially offset in some examples.

Figure 4:
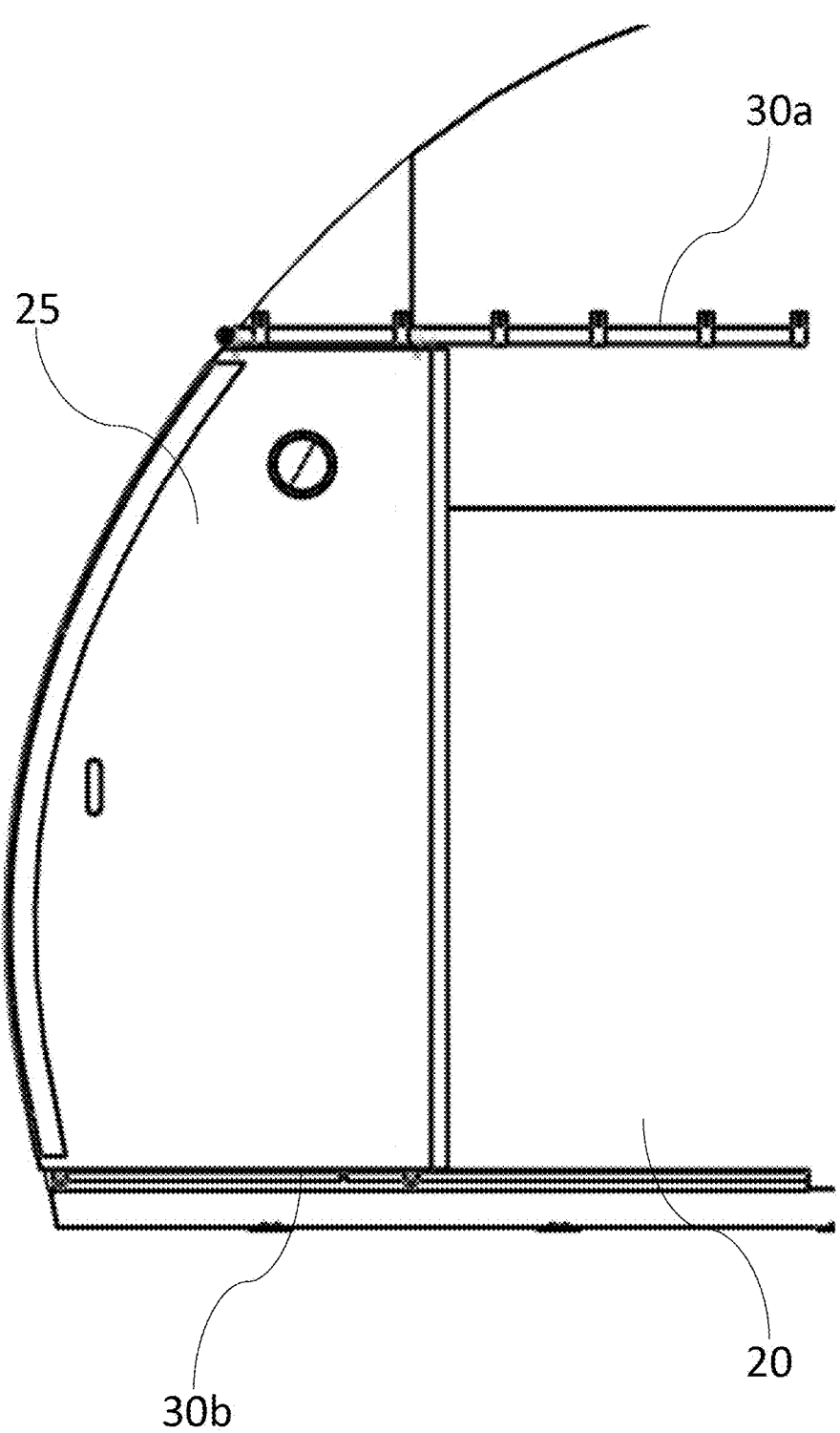
FIG. 4 shows the door in a closed position sealed in an opening of the barrier wall.

FIG. 4 shows the door 25 in a closed position in which door 25 entirely covers the opening 21 with the door 25 sealed against the barrier wall 20 to prevent the passage of smoke across the barrier wall 20.

The allowable space for the door 25 and door mechanism (in this case a rail 30a, 30b) within the cargo section 4c is limited so as to maximize the available space for cargo containers 8 and other like items. For instance, the available space within the cargo section 4c may be less than 100 mm in the direction of the longitudinal axis 19 of the fuselage 4. A system that allows the door 25 to adequately seal over the opening 21 in the barrier wall 20 is therefore needed that minimizes the space required, while ensuring the longevity of the seals on the barrier wall 20 and door 25.

Figure 5:
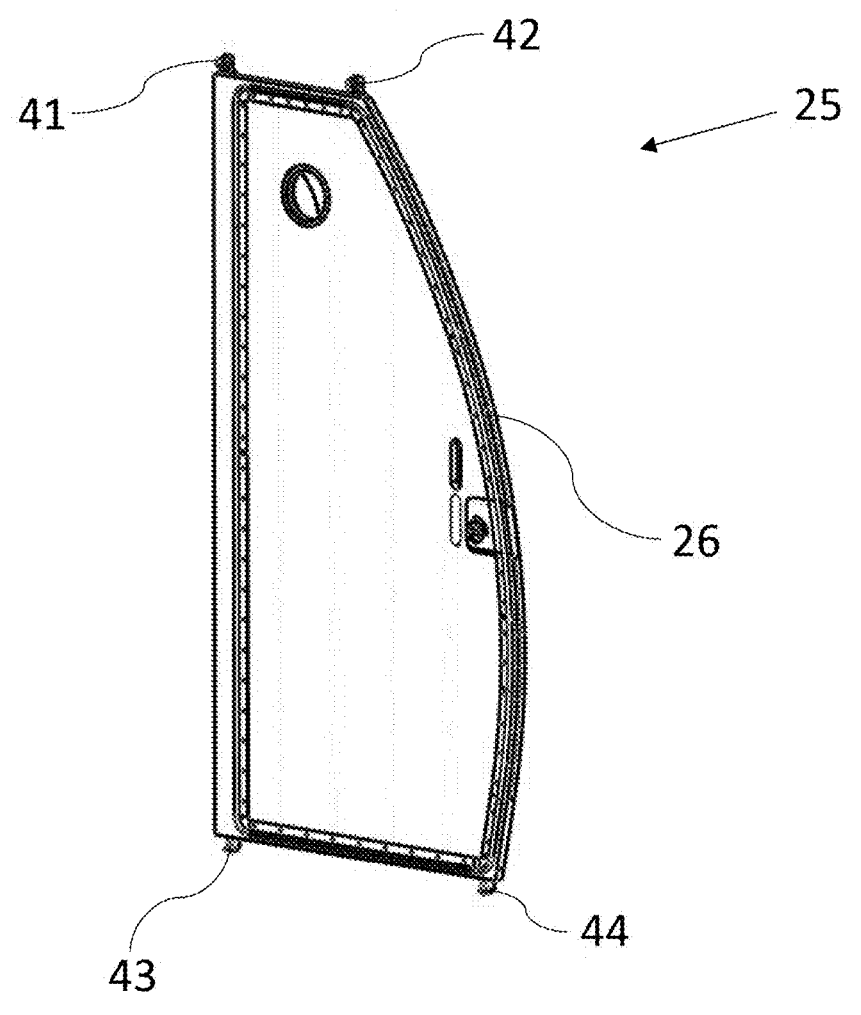
FIG. 5 shows rollers and a seal attached to the door.

As shown in FIGS. 3 and 5, a barrier wall seal 22 extends around the periphery of the opening 21 and is configured to seal against a door seal 26 that extends around a periphery of the door 25 when the door 25 is in the closed position.

FIG. 5 shows a set of rollers rotatably fixed to the door 25 by a fixture, such as the connecting bracket 37a shown in FIG. 6. A first roller 41 and a second roller 42 are arranged to move along the upper rail 30a in which a roller guard 31a helps retain the rollers 41, 42 on the rail 30a (See FIG. 6). Each roller 41, 42 is arranged to move along a respective path defined within the upper rail 30a. The paths can be considered as defining a swept volume of the respective roller 41, 42 as the door 25 moves between the open and closed positions. Similarly, a third roller 43 and a fourth roller 44 are arranged to move along the lower rail 30b in which a roller guard 31b help retain the rollers 43, 44 on the rail 30b (See FIG. 7)

The upper rail 30a includes a first ramp 51 configured to engage the first roller 41 as the first roller 41 moves along the first path so as to divert the direction of the first roller 41. Similarly, the upper rail 30a includes a second ramp 52 configured to engage the second roller 42 as the second roller 42 moves along the second path so as to divert the direction of the second roller 41.

In this manner, the first ramp 51 and second ramp 52 direct the door 25 towards the barrier wall 20 as the first roller 41 and second roller 42 engage the respective ramps 51, 52. The door seal 26 thereby seals against the barrier wall seal 22.

In order to reduce wear on the seals 22, 26, the first and second paths are arranged to ensure the door 25 translates perpendicular to the barrier wall 20 without rotation to minimize lateral moving contact between the seals 22, 26. This can be achieved by spacing the first and second rollers 41, 42 the same distance apart as the ramps 51, 52, such that the first roller 41 engages the first ramp 51 as the second roller 42 engages the second ramp 52. The first and second ramps 51, 52 would typically have the same profile in terms of height, and gradient etc.

Figure 8:
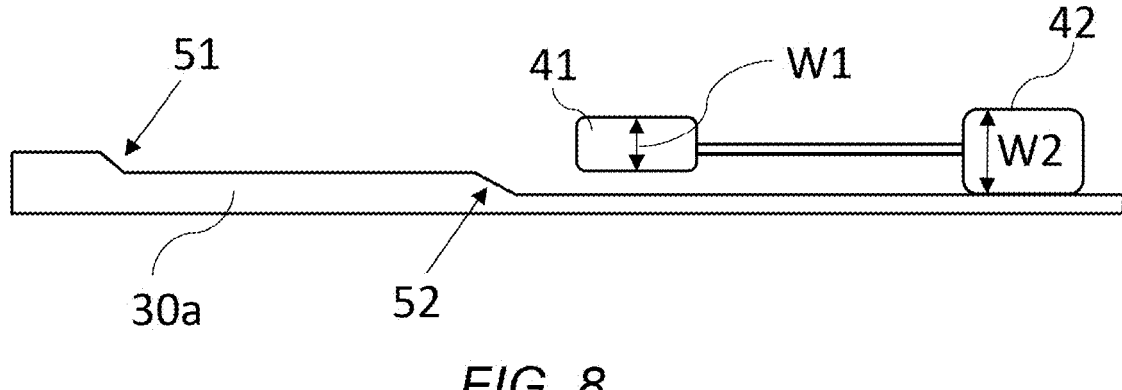
FIG. 8 shows a schematic representation of the rollers on the upper rail when the door is in the open position.
Figure 9:
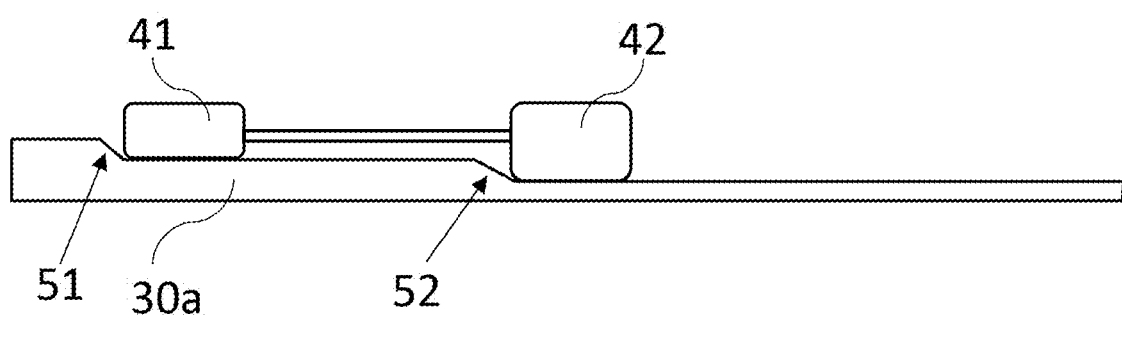
FIG. 9 shows a schematic representation of the rollers on the upper rail when the door is in an intermediate position between the open and closed positions of the door.
Figure 10:
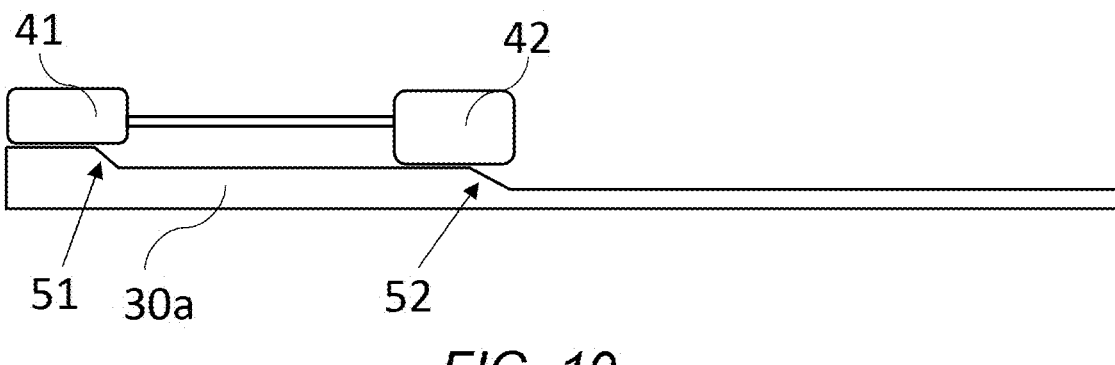
FIG. 10 shows a schematic representation of the rollers on the upper rail when the door is in the closed position.

FIGS. 8 to 10 illustrate schematically an example in which the rollers 41, 42 are configured to engage the respective ramps 51, 52 simultaneously, while ensuring that the first roller 41 bypasses the second ramp 52 such that the first roller 41 does not contact the second ramp 52 as it passes by. With this arrangement, the maximum travel of the door 25 between the open and closed positions is not restricted by the distance between the ramps 51, 52, while ensuring the door 25 only translates perpendicular to the barrier wall 20 without rotation. In other words, the plane of the door 25 remains parallel to the plane of the barrier wall 20 during movement up/down the ramps 51, 52.

As indicated on FIG. 8, the first roller 41 has a first width W1. Similarly, the second roller 42 has a second width W2. The widths W1, W2 are defined as the extent of the respective roller 41, 42 extending parallel to a rotational axis of the respective roller 41, 42. The rotational axis of the rollers 41, 42 are normal to the door 25 and barrier wall 20.

The first roller 41 has smaller width W1 than the second roller W2. In this manner, the roller assembly can be arranged such that the first and second rollers 41, 42 can share a common rail 30a while also engaging separate ramps 51, 52 without engagement of the ramp 51, 52 associated with the other roller 41, 42, i.e. the first roller 41 can bypass the second ramp 52 (as evident from FIG. 9). This allows the first and second rollers 41, 42 to have lateral extents (i.e. extending in a direction between the door 25 and the barrier wall 20) that overlap to minimize the lateral space required by the rail 30a, in contrast to a design in which each roller 41, 42 requires a respective rail, while also allowing additional space to accommodate the width W2 of the second roller 42 that might be required to ensure structural integrity.

In the example shown, the width of the ramps 51, 52, and in particular the width of the second ramp 52, is substantially equal to the difference in width between the first and second rollers 41, 42, i.e. W2−W1. Substantially in this context refers to an additional allowance for manufacturing tolerances and to avoid excessive frictional constraint between the second roller 42 and the rail 30a surfaces. This arrangement provides the minimum width of the rail 30a to ensure the first roller 41 bypasses the second ramp 52 such that the rollers 41, 42 engage the respective ramps 51, 52 in tandem (as evident when comparing FIGS. 9 and 10).

It will be appreciated that the chamfered profile of the ramps 51, 52 shown in FIGS. 8 to 10 is merely illustrative of the gradient provided by the ramps 51, 52 to move the door 25 towards the barrier wall 20. As shown in FIG. 11 for the first ramp 51, but similarly applicable to the second ramp 52, the ramp 51 is smoothly curved. In particular, the ramp 51 includes an inflection point so as to provide a substantially 'S' shaped ramp 51. The first path is thereby split into a first linear section 38a, a second linear section 38c, and a curved 'ramp' section 38b between the linear sections 38a, 38c.

The rail 30a includes two channels 32, 33. A first channel 32 defines the first path along which the first roller 41 is moveable, and a second channel 33 defines the second path along which the second roller 42 is moveable. The channels 32, 33 are arranged to ensure the rollers 41, 42 have well defined, individual paths that have lateral extents that remain overlapped, in order to best utilize the available space, while restraining undesirable lateral movement of the rollers 41, 42, i.e. lateral movement other than that resultant from the ramps 51, 52. The first channel 32 has a width substantially the same as the width of the first roller 41, and the second channel 33 has a width substantially the same as the width of the second roller 42.

To accommodate these separate paths constraining lateral movement of the roller 41, 42, the first channel 32 is stepped from the second channel 33, as shown in FIGS. 12 and 13. In particular, the surface on which the first roller 41 rolls is stepped from the surface on which the second roller 42 rolls. In this way, the rollers 41, 42 can overlap while also individually constraining lateral movement of the rollers 41, 42 independently. Note that FIGS. 12 and 13 show the door 25 in the closed position, such that the rollers 41, 42 have engaged and moved passed the ramps 51, 52.

The first channel 32 and second channel 33 each have respective first and second walls that retain the rollers 41, 42. The first channel 32 has first wall 34 adjacent the barrier wall 20 and a second wall 35 adjacent the door 25 against which the first roller 41 can abut. The first roller 41 is retained between the first and second walls 34, 35. The first wall 34 and second wall 35 are laterally offset from one another, such that the first path is defined between the first and second walls 34, 35. The first wall 34 defines a minimum distance between the first roller 41 and the barrier wall 20 and the second wall 35 defines a minimum distance between the first roller 41 and the barrier wall 20. Similarly, the second channel 33 has a first wall 34 adjacent the barrier wall 20 and a second wall 36 adjacent the door 25 against which the second roller 42 can abut. The second roller 42 is retained between the first and second walls 34, 36. The first wall 34 and second wall 36 are laterally offset from one another, such that the second path is defined between the first and second walls 34, 36. The first wall 34 defines a minimum distance between the second roller 42 and the barrier wall 20 and the second wall 36 defines a minimum distance between the second roller 42 and the barrier wall 20. The first and second channels 32, 33 may share a common first wall 34 as this can minimize the space required to accommodate the rollers 41, 42.

To provide the step 39 between the first and second channels 32, 33, while providing rotational axes of the rollers 41, 42 at the same height, the first roller 41 may have a greater diameter than the diameter of the second roller 42. This can allow the same connecting bracket 37a to be used for each roller.

It will be appreciated that the third and fourth rollers 43, 44, and the lower rail 30b, may be similarly arranged.

Figure 14:
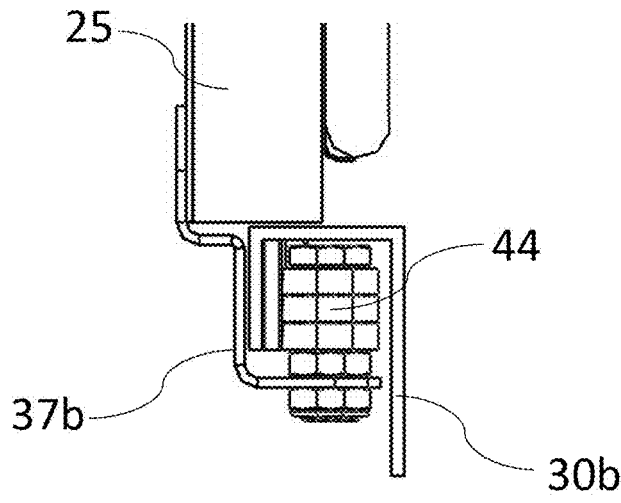
FIG. 14 shows a view of a roller of the lower rail.
Figure 15:
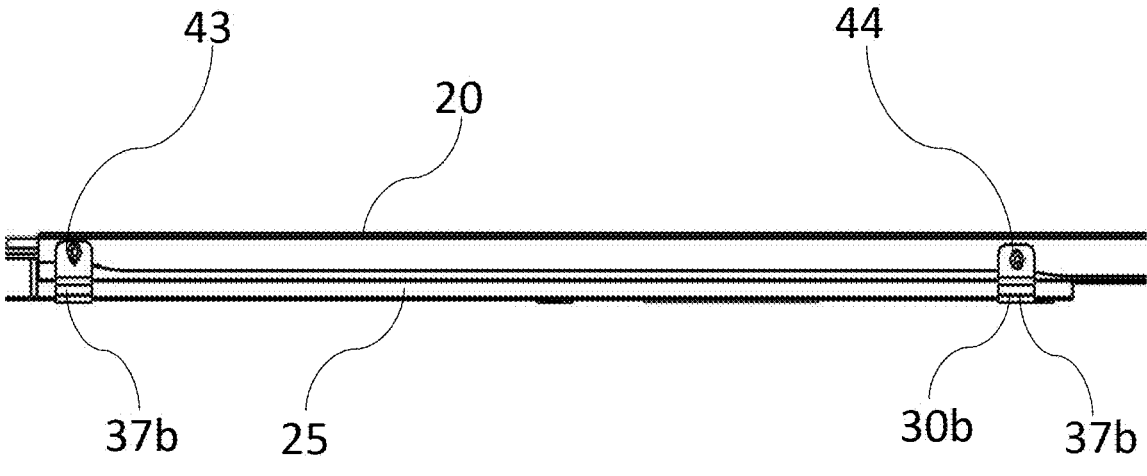
FIG. 15 shows a view of the lower rail on which the rollers are mounted.

As shown in the FIGS. 14 and 15, the third and fourth rollers 43, 44 associated with the lower rail 30b may be arranged to withstand primarily lateral forces of the rollers 43, 44, rather than the weight of the door 25. The weight of the door 25 would therefore be carried by the first and second rollers 41, 42 associated with the upper rail 30a.

In this case, the third and fourth rollers 43, 44 may have a rotational axis perpendicular to the door 25 and barrier wall 20, and perpendicular to the rotational axes of the first and second rollers 41, 42.

While the present example may include the separate channels, such as those discussed in relation to the upper rail 30b, it will be appreciated that the orientation of the rotational axes means that the roller 41, 42 may alternatively, or in addition, be maintained along its respective path by a bracket 37*b* that biases the rollers 41, 42 against the lower rail 30*b* (See FIG. 14).

Figure 16:
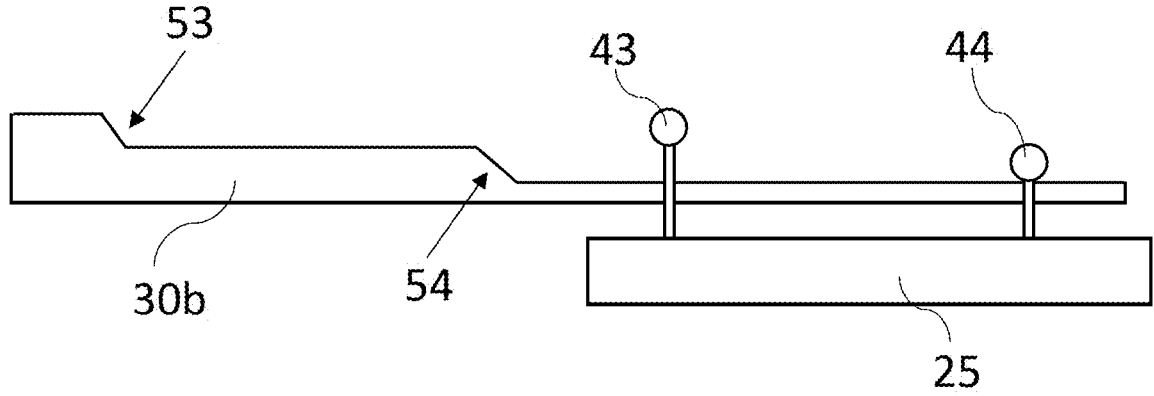
FIG. 16 shows a schematic representation of the rollers on the lower rail when the door is in the open position.
Figure 17:
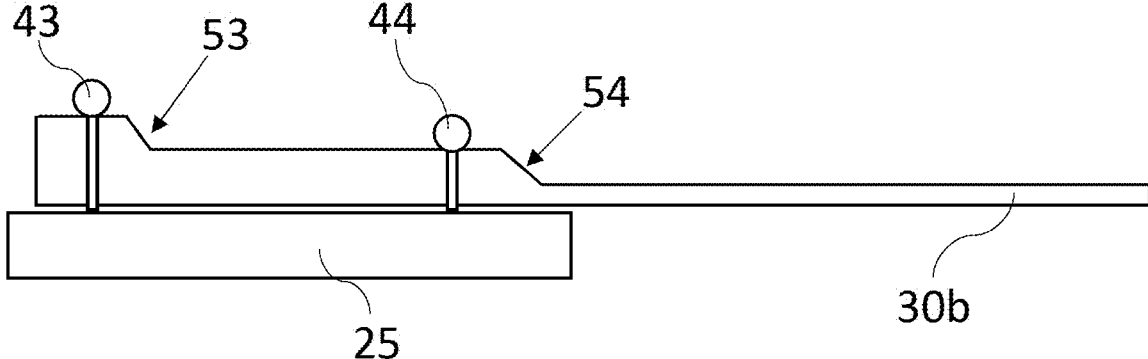
FIG. 17 shows a schematic representation of the rollers on the lower rail when the door is in the closed position.

The reduced load acting on the third and fourth rollers 43, 44 mean that the third and fourth rollers 43, 44 may be smaller than the first and second rollers 41, 42, and in particular have a reduced lateral extent extending between the door 25 and barrier wall 20. Consequently, there may be no need for the lateral extents of the third and fourth rollers 43, 44 to overlap, as the lateral space already required to accommodate the first and second rollers 41, 42 is sufficient. This is illustrated in FIGS. 16 and 17, in which it can be seen that the rollers are laterally offset from one another at all points when moving from the open position of the door 25 (FIG. 16) to the closed position of the door 25 (FIG. 17), including when traversing the third ramp 53 and fourth ramp 54, respectively. It will be appreciated that the third and fourth ramps 53, 54 are arranged to move the third and fourth rollers 43, 44 in tandem with the first and second rollers 41, 42, such that the door 25 is maintained normal to the barrier wall 20 as the door 25 is moved between the open and closed positions.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

It should be understood that modifications, substitutions, and alternatives of the invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage comprising:
fore and aft sections of the aircraft fuselage, a barrier wall separating the fore and aft sections and the barrier wall defining an opening therebetween;
a rail attached to the barrier wall;
a door moveable across the barrier wall between an open position in which the door is offset from the opening and a closed position in which the door covers the opening;
a first roller and a second roller each rotatably fixed to the door and moveable on the rail along respective first and second paths to move the door between the open and closed positions;
wherein the rail includes a first ramp configured to engage the first roller as the first roller moves along the first path, the first ramp configured to direct the first roller towards the barrier wall, and a second ramp configured to engage the second roller as the second roller moves along the second path, the second ramp configured to direct the second roller towards the barrier wall;
wherein the first roller is configured to engage the first ramp as the second roller engages the second ramp to move the door towards the barrier wall;
wherein the first and second rollers each have a width extending parallel to a rotational axis of a respective roller, wherein the width of the second roller is greater than the width of the first roller; and
wherein a width difference between the first and second rollers is substantially the same as a height of the second ramp.

2. The aircraft fuselage of claim 1, wherein a portion of a lateral extent of the first roller between the door and barrier wall overlaps with the lateral extent of the second roller.

3. The aircraft fuselage of claim 1, wherein the first path is arranged such that the first roller bypasses the second ramp.

4. The aircraft fuselage of claim 1, wherein the first and second rollers are each retained between a first wall of the rail adjacent the barrier wall and a second wall laterally spaced from the first wall and adjacent the door.

5. The aircraft fuselage of claim 4, wherein the first and second rollers are retained by a common first wall.

6. The aircraft fuselage of claim 1, wherein the first roller has a diameter greater than the second roller.

7. The aircraft fuselage of claim 1, wherein the rail comprises a first channel defining the first path, and a second channel defining the second path, wherein the first channel is stepped from the second channel.

8. The aircraft fuselage of claim 1, wherein the rail comprises a first channel defining a direction of the first path, the first channel having a width substantially same as the first roller, and a second channel defining a direction of the second path, the second channel having a width substantially same as the second roller.

9. The aircraft fuselage of claim 1, wherein the rail is an upper rail located towards an upper end of the door.

10. The aircraft fuselage of claim 9, comprising a lower rail located towards a lower end of the door.

11. The aircraft fuselage of claim 1, wherein each ramp is smoothly curved.

12. The aircraft fuselage of claim 1, wherein each ramp includes an inflection point so as to be substantially 'S' shaped.

13. The aircraft fuselage of claim 1, wherein the first path and second path include linear sections either side of a ramp section at which the respective first or second ramp is located.

14. The aircraft fuselage of claim 1, wherein a door seal extends around a periphery of the door and/or a barrier wall seal extends around a periphery of the opening in the barrier wall for sealing the door against the barrier wall.

15. The aircraft fuselage of claim 1, wherein the door is located on an aft side of the barrier wall.

16. The aircraft fuselage of claim 1, wherein an aft side of the fuselage is a cargo section comprising one or more containers.

17. The aircraft fuselage of claim 1, wherein the barrier wall is attached to a fuselage frame.

18. An aircraft comprising the aircraft fuselage of claim 1.

* * * * *